US008860503B2

(12) United States Patent
Bogner

(10) Patent No.: US 8,860,503 B2
(45) Date of Patent: Oct. 14, 2014

(54) FLOATING BIAS GENERATOR

(75) Inventor: Peter Bogner, Wernberg (AT)

(73) Assignee: Infineon Technologies AG, Neubiberg (DE)

( * ) Notice: Subject to any disclaimer, the term of this patent is extended or adjusted under 35 U.S.C. 154(b) by 99 days.

(21) Appl. No.: 13/530,146

(22) Filed: Jun. 22, 2012

(65) Prior Publication Data

US 2013/0343109 A1  Dec. 26, 2013

(51) Int. Cl.
*G05F 1/10* (2006.01)

(52) U.S. Cl.
USPC ......................................................... 327/540

(58) Field of Classification Search
USPC .............. 326/80, 81; 327/534, 535, 536, 537, 327/538, 540, 541, 542, 543
See application file for complete search history.

(56) References Cited

U.S. PATENT DOCUMENTS

| | | | |
|---|---|---|---|
| 6,144,326 A * | 11/2000 | Krone et al. | 341/118 |
| 6,774,674 B2 * | 8/2004 | Okamoto et al. | 326/80 |
| 6,781,422 B1 * | 8/2004 | Yang | 327/108 |
| 7,514,984 B2 * | 4/2009 | Park et al. | 327/536 |
| 7,535,262 B2 * | 5/2009 | Abdoulin | 327/58 |

* cited by examiner

*Primary Examiner* — Jeffrey Zweizig

(57) ABSTRACT

In various embodiments a circuit is provided which may include a node at which a circuit potential may be provided; an alternating voltage providing circuit configured to provide a DC current free alternating voltage; a rectifier coupled to the alternating voltage providing circuit, the rectifier including a first rectifier terminal and a second rectifier terminal, wherein the first rectifier terminal or the second rectifier terminal may be coupled to the node; and a first output terminal and a second output terminal, wherein the first output terminal may be coupled to the first rectifier terminal to provide a first potential and wherein the second output terminal may be coupled to the second rectifier terminal to provide a second potential different from the first potential, the difference between the first potential and the second potential defining an output voltage, wherein the output voltage may be constant independent of the circuit potential.

25 Claims, 3 Drawing Sheets

PRIOR ART

FLOATING BIAS GENERATOR

TECHNICAL FIELD

Various embodiments relate to a floating bias generator.

BACKGROUND

In automotive applications switched capacitor circuits are widely used, among other reasons, due to the benefit of robustness and compactness. Sometimes switched capacitor circuits may include switches which may operate at a different voltage level than the clock generator or other electronic components of the overall system such as signal processing logic which may be coupled to the switched capacitor circuit. The clock generator providing clock signals to the switches may be for example driven via a dynamic level shifter providing a voltage level required by the clock generator. However, a switch within the switched capacitor circuit located at the shifted voltage level needs a local voltage supply which is provided by an additional circuit. Usually the additional circuit providing the operating voltage to the switch includes a bias resistor coupled between a current source and the voltage (power) supply of the overall electronic system which may be a battery of the vehicle, for example. The current flowing through the bias resistor generates a voltage which may be supplied to the floating switches within the switched capacitor circuit and the floating signal processing logic coupled to the switched capacitor circuit. The main disadvantage of this approach may be seen in the fact that there is a permanent current flow from the additional current source to the main voltage (power) supply. This current flow may cause voltage drops along the lines of the electronic system and hence corrupt measurements performed within the overall system, for example by the switched capacitor circuit and the signal processing logic coupled thereto.

SUMMARY

In various embodiments a circuit is provided which may include a node at which a circuit potential may be provided; an alternating voltage providing circuit configured to provide a DC current free alternating voltage; a rectifier coupled to the alternating voltage providing circuit, the rectifier including a first rectifier terminal and a second rectifier terminal, wherein the first rectifier terminal or the second rectifier terminal may be coupled to the node; and a first output terminal and a second output terminal, wherein the first output terminal may be coupled to the first rectifier terminal to provide a first potential and wherein the second output terminal may be coupled to the second rectifier terminal to provide a second potential different from the first potential, the difference between the first potential and the second potential defining an output voltage, wherein the output voltage may be constant independent of the circuit potential.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1:
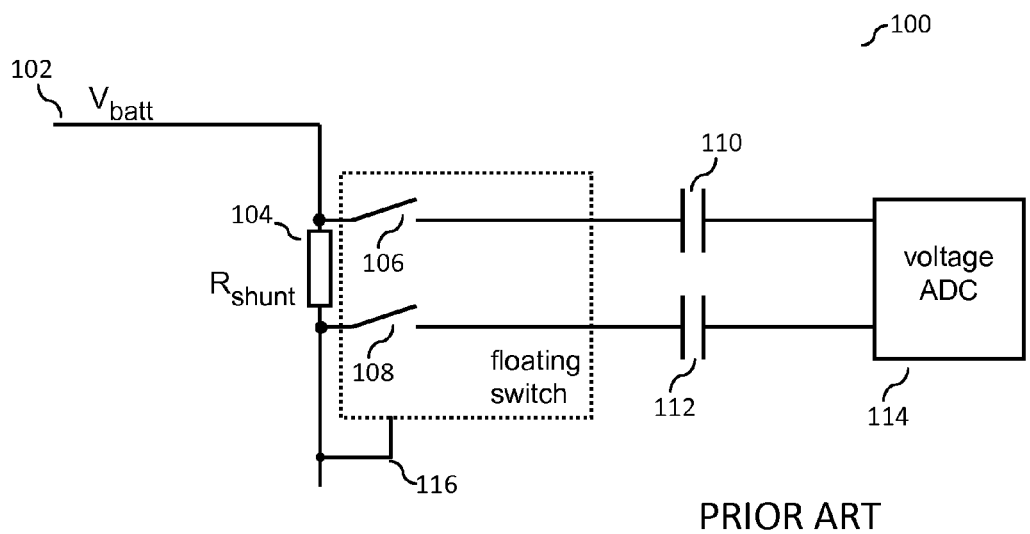
FIG. 1 shows a standard implementation of a circuit with a switched capacitor ADC and floating switches.

In FIG. 1 a standard implementation of a circuit 100 with switched capacitor ADC (analog-to-digital converter) with floating switches is shown. The circuit 100 includes an input 102 which may be coupled to a battery of the vehicle. A shunt resistor 104 may be coupled to the input 102 of the circuit 100. A controlled terminal of a first floating switch 106 may be coupled to the input 102, a second controlled terminal of the first floating switch 106 may be coupled to one side of a first capacitor 110. The other side of the first capacitor 110 may be coupled to a first input of an ADC 114. In a similar fashion, a controlled terminal of a second floating switch 108 may be coupled to the electrical path downstream of the shunt resistor 104, a second controlled terminal of the second floating switch 108 may be coupled to one side of a second capacitor 110. The other side of the second capacitor 112 may be coupled to a second input of the ADC 114. The first capacitor 110 and the second capacitor 112 may be configured to sample the voltage difference across the shunt resistor 104 when the first switch 106 and the second switch 108 are closed (i.e. switched into a conducting state).

The supply voltage $V_{batt}$ may be for example in the range of 40V. The shunt resistor 104 may have resistance values in the range from a few Milliohms up to a few Ohms, for example. The first switch 106 and the second switch 108 are referred to as floating switches as they are not connected to a fixed reference potential such as the ground potential. The reference for the first floating switch 106 and the second floating switch 108 may be defined by connecting their arrangement of the floating switches to either side of the shunt resistor 104, for example, as indicated by the dashed line representing a reference line 116. The reference for the floating switches is therefore derived from or based on the potential either upstream of the shunt resistor 104 or downstream of the shunt resistor 104 (the latter scenario being depicted in FIG. 1). However, this reference potential is not fixed but floating, i.e. it may change its value under the influence from other electronic components connected downstream of the shunt resistor 104, i.e. connected to the electrical line exiting the shunt resistor 104 below the shunt resistor 104 in FIG. 1.

Figure 2:
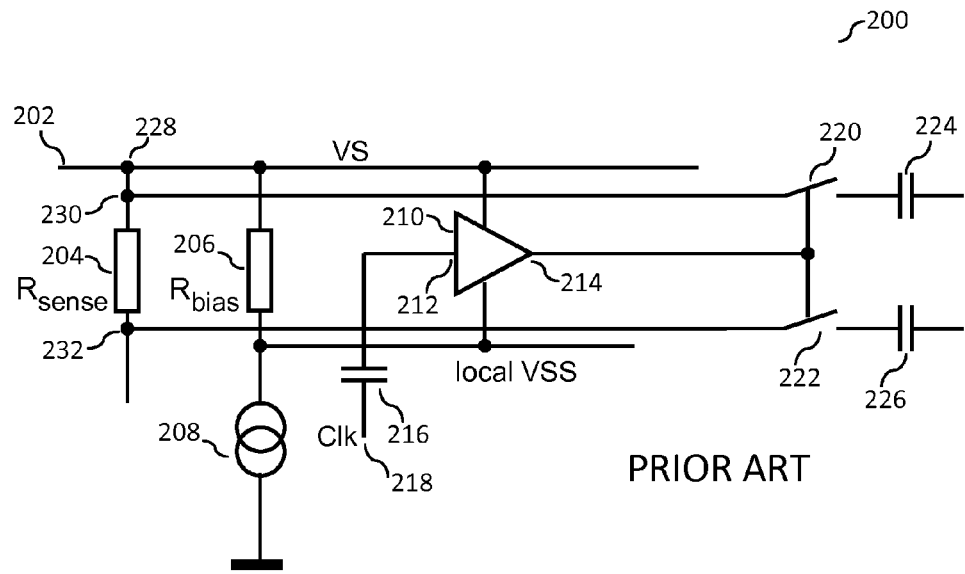
FIG. 2 shows a more detailed view of a standard implementation of a circuit with a switched capacitor ADC and floating switches supplied by a locally generated voltage.

A more detailed view of the standard implementation of the circuit 100 with a switched capacitor ADC as shown if FIG. 1 is displayed in FIG. 2. The circuit 200 includes an input 202 which may be coupled to a voltage (power) supply, for example a battery of the vehicle. The input 202 is coupled to a first terminal 228 of the circuit 200. A sense resistor 204 including a first sense resistor terminal 230 and a second sense resistor terminal 232 may be provided, wherein the first sense resistor terminal 230 may be coupled to the first terminal 228 of the circuit 200. A controlled terminal of a first floating switch 220 may be coupled to the first sense resistor terminal 230, a second controlled terminal of the first floating switch 220 may be coupled to one side of a first capacitor 224. The other side of the first capacitor 224 may be coupled to a first input of an ADC or of another signal processing logic which is not shown in FIG. 2. In a similar fashion, a controlled terminal of a second floating switch 222 may be coupled to second sense resistor terminal 232, a second controlled terminal of the second floating switch 222 may be coupled to one side of a second capacitor 226. The other side of the second capacitor 226 may be coupled to a second input of an ADC or of another other signal processing logic which is not shown in FIG. 2. A control terminal of the first floating switch 220 and a control terminal of the second floating switch 222 are both coupled to an output of a control circuit 214 which, for example, may be configured as a latch. The control circuit 214 has a first power input and a second power input. The first power input is coupled to a first side of a bias resistor 206 and the second power input is coupled to a second side of the bias resistor 206. The second side of the bias resistor 206 is further coupled to a current source 208, the first side of the bias resistor 206 is coupled to the first terminal 228 of the circuit 200. The control circuit 210 further includes an input 212 which is coupled to a clock generator (not shown in FIG. 2) via a third capacitor 216 such that a clock signal 218 may be provided to the control circuit. The clock signal provided to the control circuit 214 may be used to switch the first switch 220 and/or the second switch 222 between a conducting and a non-conducting state.

The circuit 200 shown in FIG. 2 shows a standard topology used to generate a local voltage supply VSS for the control circuit 210 and the first floating switch 220 and the second floating switch 220 which are controlled by the control circuit 210. In the circuit 200 shown in FIG. 2, the bias resistor 206 is biased with a current provided by the current source 208. In other words, the current flowing from the current source 208 to first terminal 228 of the circuit 200 towards the input 202 and thereby to the voltage (power) supply generates a voltage drop across the bias resistor 206. That resulting voltage drop, i.e. the potential difference, is applied to the control circuit 210 via its first power input and its second power input. The locally generated supply voltage (local VSS) may be further provided to other electronic components (not shown in FIG. 2) such as to floating logic devices/components of an ADC which may be coupled to the first capacitor 224 and the second capacitor 226. As already mentioned, this local voltage (power) supply scheme suffers the disadvantage that the current provided by the current source 208 permanently flows through the bias resistor 206 towards the first terminal 228 of the circuit 200 and eventually to the voltage (power) supply such as a vehicle battery connected to the input 202 of the circuit 200. This current may cause a voltage drop along the electrical connections connecting the current source 208 with the input 202 of the circuit 200. Therefore, the electrical path for the current from the current source 208 is separated from the electrical path between the first terminal 202 and the first switch 220 in order to minimise the falsifying effect of that current flow on the voltage sampled by the first capacitor 224. This, however, may complicate the design as an extra pin or terminal (either the terminal 228 or the first sense resistor terminal 230) have to be provided.

Figure 3:
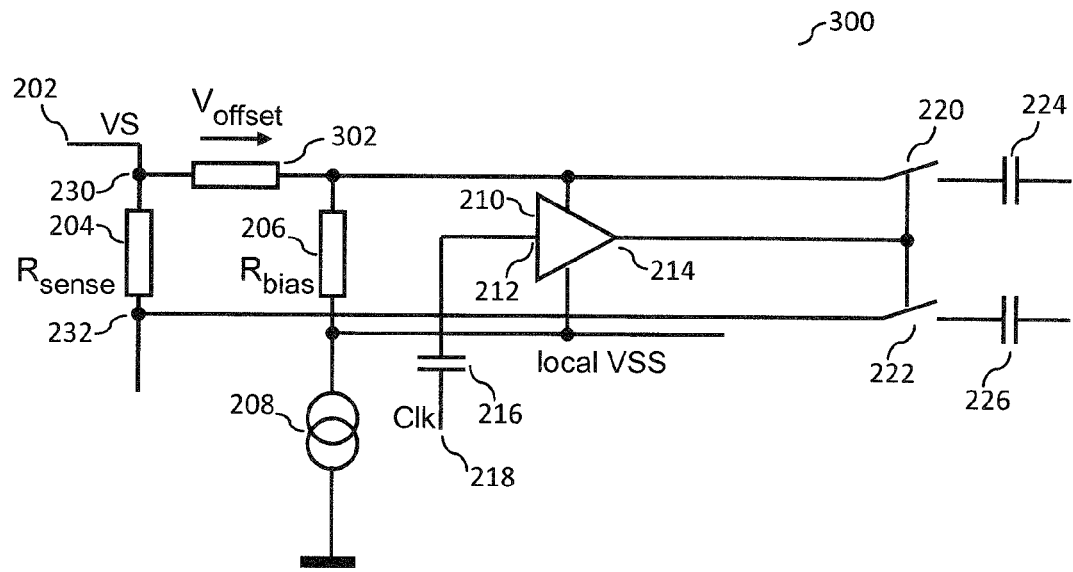
FIG. 3 shows a modified implementation of the circuit shown in FIG. 2.

In FIG. 3 a slightly modified version of the circuit 200 shown in FIG. 2 is presented. Due to the similarity of both circuits, the same components/devices with the same functions carry the same reference numbers and they will not be described again in the context of circuit 300 shown in FIG. 3. Only the differences and new or different components will be pointed out.

The circuit 300 shown in FIG. 3. differs from the circuit 200 of FIG. 2 already described in that the electrical path between the bias resistor 206 and the first sense resistor terminal 230 is shared as it is used as discharge path for the current from the current source 208 as well as a sense line for the voltage sampled by the first capacitor 224. It may be seen that in the circuit 300 the separate sense line which was present in the circuit 200 shown in FIG. 2 in the form of the electrical line between the first terminal 228 and the first switch 220 has been removed and instead combined with the electrical path between the first sense resistor terminal 230 and the bias resistor 206. In other words, the first terminal 228 from FIG. 2 is eliminated and the current flowing from the current source 208 through the bias resistor 206 towards the first sense resistor terminal 230 flows along a part of the electrical line used to sample the voltage/current provided at the input 202 of the circuit 300. The current flow from the current source 208 along the just described circuit line may cause an offset voltage $V_{offset}$, the magnitude of which will depend of the line resistance 302 of that electrical path. The offset voltage $V_{offset}$ may become significant, for example, when the sense resistor 204 is an external resistor and only one pair of pins or terminals is used to connect the sense resistor 204 to the circuit 300. In such a case the bias current from the current source 208 has to be conducted via the same electrical line as the sample current conducted along the sense line from the first sense resistor terminal 230 to the first switch 220. Also, the longer the length of the combined electrical path, the larger the offset voltage $V_{offset}$ may become.

The circuit 300 presented in FIG. 3 is provided with one pin/terminal (the first sense resistor terminal 230) instead of two separate pin/terminals (the terminal 228 and the first sense resistor terminal 230 as shown in FIG. 2). However, combining at least a part of the bias current line and the sense line may lead to corrupted measurements by the signal processing logic using the voltage sampled by the first capacitor 224 and the second capacitor 226 because, as already explained, the bias current may cause a voltage drop ($V_{offset}$) along the combined electrical path, i.e. also along the sense path between the first sense resistor terminal 230 and the first capacitor 224.

In the standard schemes used to generate a local supply voltage for floating switches (the first switch 220 and the second switch 222) and floating logic (for example an ADC (not shown in FIGS. 2 and 3) which may be coupled to the first capacitance 224 and the second capacitance 226) as explained on the basis of the circuit 200 shown in FIG. 2 and the circuit 300 shown in FIG. 3, PMOSFETs (p-channel metal-oxide-semiconductor field effect transistor) may have to be used. As the supply potential VS provided at the input 202 of the circuit 300 is chosen as the upper reference potential for the voltage generated by conducing the current from the power supply 208 through the bias resistor 206, the control circuit 214 is not able to provide voltages higher than the supply voltage VS to any one of the first floating switch 220 and the second floating switch 222. The control circuit 214 is provided with the supply voltage VS at its first power input and by a voltage equal to the supply voltage VS reduced by the voltage across the bias resistor 206. Therefore, only switching devices may be used which may be operated with a control voltage that is smaller than the voltage applied to any one of the controlled terminals—PMOSFETs fulfil that condition.

When using any one of the circuit 200 of FIG. 3 and the circuit 300 of FIG. 3, the use of NMOSFETs (n-channel MOSFETs) may not be possible without further adaptation of the circuits as those transistors require a gate voltage which is larger than the voltage applied to any one of the drain/source terminals for operation. The use of NMOSFETs may be of interest in those schemes, as the NMOSFET tends to have a smaller on-state resistance compared to a PMOSFET of the same size.

A different scheme for the generation of a local supply voltage VSS is presented in FIG. 4 on the basis of the circuit 400 for generating a local bias voltage according to various embodiments (in the following referred to as the circuit 400). The circuit 400 is based on the circuit 200 shown in FIG. 2, hence the same components/devices with the same functions carry the same reference numbers and they will not be described again in the context of circuit 400 shown in FIG. 4. Only the differences and new or different components will be pointed out.

Figure 4:
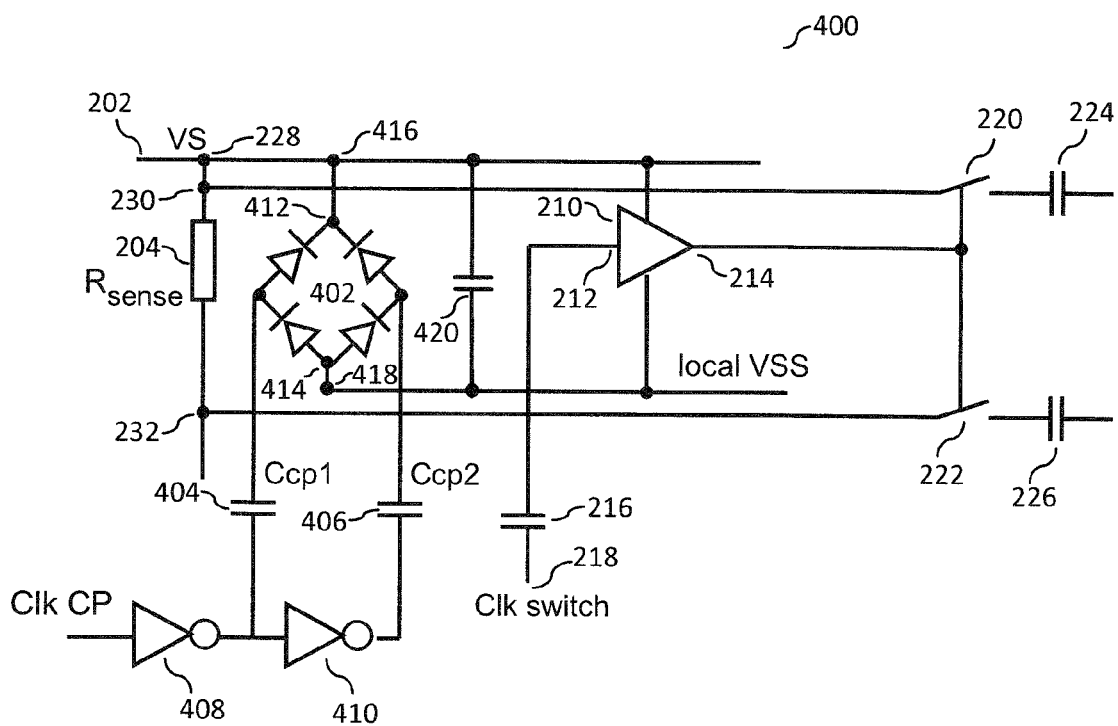
FIG. 4 shows a circuit for generating a local bias voltage according to various embodiments.

The circuit 400 shown in FIG. 4 differs from the circuit 200 of FIG. 2 already described in the way in which the floating local voltage supply VSS is generated. The bias resistor 206 from FIG. 2 is replaced by a rectifier 402, in this case a full-wave rectifier in the form of a diode bridge. A first rectifier terminal 412 is coupled to a first output terminal 416 of the circuit 400. In this embodiment, the first output terminal 416 is coupled to the node 228 of the circuit 400 which in turn is coupled to the first sense resistor terminal 230 and to the input 202 of the circuit 400. The first output terminal 416 may be also coupled to the first power input of the control circuit 210. A second rectifier terminal 414 is coupled to a second output terminal 418 of the circuit 400. The second output terminal 418 may be further coupled to the second power input of the control circuit 214. A fourth capacitor 420 may be provided, coupled between the first output terminal 416 and the second output terminal 418. Although the node 228 and the first sense resistor terminal 230 are shown as separate nodes, the node 228 and the first sense resistor terminal 230 in the circuit 400 according to various embodiments may be combined to one and the same element. The first rectifier terminal 412 may be also directly coupled to node 228 of the circuit 400 as shown in FIG. 4, i.e. not via the first output terminal 416 of the circuit 400. The combining of a part of the sense line, i.e. the electrical path between the first sense resistor terminal 230 (or equivalently the node 228) and the first floating switch 220, with the electrical path between the rectifier 402 and the first sense resistor terminal 230 (or equivalently the node 228) is unproblematic in the circuit 400 according to various embodiments as it does not suffer from the problems presented in connection with the circuit 200 shown in FIG. 2 and the circuit 300 shown in FIG. 3. As will be explained in more detail below, there is no DC current flow from the rectifier 402 towards the voltage (power) supply coupled to the input 202 of the circuit 400 such that no offset voltage which may corrupt the sensing procedure is generated.

An output of a first inverter 408 may be coupled to a first input of the rectifier 402 via a first charge pump capacitor 404. The first inverter 408 also includes an input at which a charge pump clock signal Clk CP may be provided. The output of the first inverter 408 may be coupled to an input of a second inverter 410. An output of the second inverter 410 may be coupled to a second input of the rectifier 402.

In the circuit 400 according to various embodiments an alternating voltage providing circuit may be used to generate a DC current free alternating voltage. The alternating voltage providing circuit may be configured as a charge pump including two inverters and two capacitors. The first charge pump capacitor 404 and the second charge pump capacitor 406 are alternately charged and discharged by the first inverter 404 and the second inverter 406, respectively depending on the state of the charge pump clock signal Clk CP. According to various embodiments the charge pump clock signal Clk CP provided at the input of the first inverter 408 may be inverted with respect to the charge pump clock signal provided at the input of the second inverter 410. The charge pump clock signal Clk CP may for example be a square wave signal. The first charge pump capacitor 404 and the second charge pump capacitor 406 may be also configured to block DC current components by galvanically separating the inverters from the rectifier 402. Thereby an actual current flow between the charge pump and the rectifier 402 may be prevented. In other words, there may be no direct current flow from the charge pump through the rectifier 402 towards the input 202 of the circuit 400 according to various embodiments such that there is no offset voltage generated along the electrical lines connecting the rectifier 402 with the input 202 of the circuit 400 according to various embodiments. The rectifier 402 transforms the DC current free alternating voltage into a local supply voltage (local VSS) which may be for example provided to the control circuit 214 controlling the state of the first floating switch 224 and the second floating switch 226 or other electrical devices/components. The charge pump together with the rectifier 402 may form a floating architecture such that any one of the first rectifier terminal 412 and the second rectifier terminal 414 may be selected to be the negative node and may be connected independent of the driving circuit. In other words, the reference for the local supply voltage VSS provided by the rectifier 402 may be freely chosen. As shown in the embodiment of the circuit 400 in FIG. 4. the supply voltage VS is chosen as the reference for the local generation scheme provided by the charge pump and the rectifier 402. That is, in the embodiment of the circuit 400 shown in FIG. 4 the first rectifier terminal 412 (and thereby the output terminal 416) is coupled to the node 228 of the circuit 400 and hence the value of the potential present at the node 228 which in this embodiment corresponds to the supply potential VS is imposed as a reference potential on the potential provided by the rectifier at its first rectifier terminal 412. Alternatively, a different potential reference may be chosen. For example, instead of the first rectifier terminal 412 being coupled to the node 228 of the circuit 400, the second rectifier terminal 414 may be connected to the second sense resistor terminal 232 (with the first output terminal 416 then not being coupled to the input 202 of the circuit 400) which may then fulfil the role of the node 228. In any case, the output voltage generated by the rectifier 402 and also applied across the fourth capacitor 420 may be constant in the sense that it may be independent of the actual potential present at the node 228 which in the embodiment of the circuit 400 shown in FIG. 4 may be the supply potential VS. However, in general the potential at the node 228 may change due to influence of electrical components/devices coupled upstream or downstream of the node 228, for example a low drop regulator (not shown in FIG. 4) coupled between the input 202 and the node 228 of the circuit 400 according to various embodiments.

As the reference potential for the bias voltage providing circuit, e.g. the charge pump, and the rectifier 402 may be freely chosen, it is possible to use PMOSFETs or NMOSFETS as the first floating switch 220 and/or the second floating switch 222. In the case where the second rectifier terminal 414 is coupled to the second sense resistor terminal 232 (instead of the shown case of the first rectifier terminal 412 being coupled to the node 228 and/or the first sense resistor terminal 230) the potential provided by the rectifier 402 at its first rectifier terminal 412 is larger than the potential provided at the first sense resistor terminal 230 which is applied to a controlled terminal of the first switch 220 during measuring phase. Therefore, the control circuit 210 may be able to provide a voltage to the control terminal of the first floating switch 220 and/or the second floating switch 222 which is larger than the voltage applied to the controlled terminals of the first floating switch 220 and/or the second floating switch 222 without any further modifications (which would be needed in the circuit 200 of FIG. 2 and the circuit 300 of FIG. 3 if NMOSFETs were to be used there). This allows for the use of NMOSFETs which require an operating gate potential to be larger than the source potential. In the case as depicted by the circuit 400 according to various embodiments in FIG. 4 where the first rectifier terminal 412 is coupled to the node 228 (or equivalently to the first sense resistor terminal 230), the potential provided by the rectifier 402 at its first rectifier terminal 412 is smaller than the potential provided at the first sense resistor terminal 230 which is applied to a controlled terminal of the first switch 220 during measuring phase. Therefore, the potential provided by the rectifier 402 at its first terminal 412 which is supplied to the control circuit 210 via its first power input may be essentially smaller than the potential applied to the controlled terminal of the first floating switch 220. Thus, in this case the first floating switch 200 may be embodied by a PMOSFET which does not require its control terminal potential, for example its gate potential, to be larger than its controlled terminal potential, for example its source potential. As the reference for the output voltage output by the rectifier 402 may be freely chosen, for example by connecting either the first rectifier terminal 412 or the second rectifier terminal 414 to the node 228 the location of which within the circuit 400 according to various embodiments may be freely chosen, the circuit 400 may be easily adapted to the choice of transistors used as the first floating switch 220 and/or the second floating switch 222. In other words, one of the outputs of the rectifier 402, i.e. the first rectifier terminal 412 or the second rectifier terminal 414, may be coupled to an arbitrary potential which, by doing so, will be used as a reference voltage by the floating architecture of the rectifier 402. As the first charge pump capacitor 404 and the second charge pump capacitor 410 are configured to provide DC decoupling, no DC bias current will be injected from the alternating voltage providing circuit, for example the charge pump, via the rectifier 402 towards the voltage (power) supply providing the supply voltage VS. Hence there will be no offset voltage generated along the electrical lines used for sensing. The circuit 400 according to various embodiments may be therefore used in applications, where an offset free voltage generation may be required, for example for external sense resistors.

As already mentioned, the charge pump clock signal Clk CP may be a square wave signal. The amplitude of the charge pump clock signal Clk CP may correspond to the difference of the potentials provided at the first rectifier terminal 412 and the second rectifier terminal 414, respectively. That is, this potential difference may correspond to the generated local supply voltage VSS, i.e. the output voltage. In other words, the amplitude of the output voltage may be determined by the amplitude of the charge pump clock signal Clk CP and therefore remain constant independent of the potential at the node 228. A fluctuation of the potential at the node 228 may not affect the output voltage generated by the bias voltage providing circuit, as the potential provided at the rectifier terminal which is not connected to the node 228 may always have the predetermined offset from the rectifier terminal which is connected to the node 228. Thus, by choosing the amplitude of the charge pump clock signal Clk CP, the magnitude of the generated local supply voltage VSS may be adjusted. In the embodiment of the circuit 400 in FIG. 4 showing a practical example where the output voltage is provided to the control circuit 210 controlling the first switch 220 and the second switch 222, the amplitude of the charge pump clock signal Clk CP may be chosen such that it is larger than the voltage drop across the sense resistor 204 which may be sensed by an ADC (not shown in FIG. 4) coupled to the first capacitor 224 and the second capacitor 226. In this sense, the ADC which may be connected to the first capacitor 224 and the second capacitor 226 may be seen as a capacitive load. The amplitude of the charge pump clock signal Clk CP may be 1.5V, for example. Therefore, a local supply voltage of 1.5V (i.e. the difference between the potential provided at the first rectifier terminal 412 and the potential provided at the second rectifier terminal 414) may be output by the rectifier 402 and thus provided to the control circuit 402. However, the absolute values of the potentials (for example compared with an external stable reference) provided at first rectifier terminal 412 and the second rectifier terminal 414 may fluctuate in unison, dictated by the fluctuation of the potential present at the node 228. In other words, the amplitude of the charge pump clock signal Clk CP may define a constant voltage difference between the potentials provided at the first rectifier terminal 412 and the second rectifier terminal 414, wherein any one of those potentials may be preset by the possibly "moving" (i.e. fluctuating) potential of the node 228 to which the corresponding rectifier terminal may be coupled.

As previously mentioned, the output voltage generated by the rectifier 402 may be applied across the fourth capacitor 420 which may serve as an energy reservoir for the control circuit 210. The control circuit 210 may draw some current from the fourth capacitor 420, for example every time inverters provided in the control circuit 210 are switched. In order for the fourth capacitor 420 to be able to provide a stable local supply voltage to the control circuit 210, the times during which the fourth transistor 420 is charged may be chosen the same or longer than the times the transistor 420 is discharged. Thus, the ratio between the capacitance of the two charge pump capacitors 404, 406 and the frequency of the charge pump clock signal Clk CP may be chosen appropriately. For example, the charge pump clock signal Clk CP may be chosen larger than the frequency of the clock signal Clk provided at the input 212 of the control circuit 210. However, with increasing frequency of the clock signal Clk the capacities of the charge pump capacitors 404, 406 may be chosen smaller.

In accordance with various embodiments of the circuit 400 shown in FIG. 4, the rectifier 402 may be formed using CMOS diodes instead of the ordinary bipolar junction diodes. The term CMOS diodes refers to a CMOS transistor in which the gate terminal is coupled to the source/drain terminal CMOS diodes may require less space compared to bipolar junction diodes. In addition, CMOS diodes may have a smaller threshold voltage which may be on the order of 300 mV, for example, as compared to the usual 600 mV in p-n-junction diodes. Using CMOS diodes instead of ordinary p-n-junction diodes for the implementation of the rectifier 402 in the circuit 400 according to various embodiments may therefore enable covering of a wider range with the generated local supply voltage VSS.

According to various embodiments, the rectifier 402 may be configured as a half bridge with two diodes only. In that case, the second inverter 410 and the second charge pump capacitor 406 do not have to be provided.

The alternating voltage providing circuit configured to provide a DC current free alternating voltage which in the embodiment of the circuit 400 according to various embodiments is provided in the form of a charge pump is only one possible implementation providing that functionality. Instead of a charge pump including the two inverters 408, 410 and the two charge pump capacitors 404, 406, a transformer may be used. The primary side of the transformer may be driven by a power supply and the secondary side of the transformer, for example a first terminal and a second terminal of the inductor arranged on the secondary side of the transformer, may be coupled to the first input and the second input of the rectifier 402, respectively. Due to the galvanic separation between the inductor on the primary side and the inductor on the secondary side of the transformer, the transformer may be seen to be equivalent with regard to the generation of a DC current free alternating voltage. In general, any circuit which provides a first pulsed signal free of DC components and a second pulsed signal free of DC current components, wherein the second pulsed signal is inverse with respect to the first pulsed signal (or vice versa), may be used as the alternating voltage providing circuit.

Figure 5:
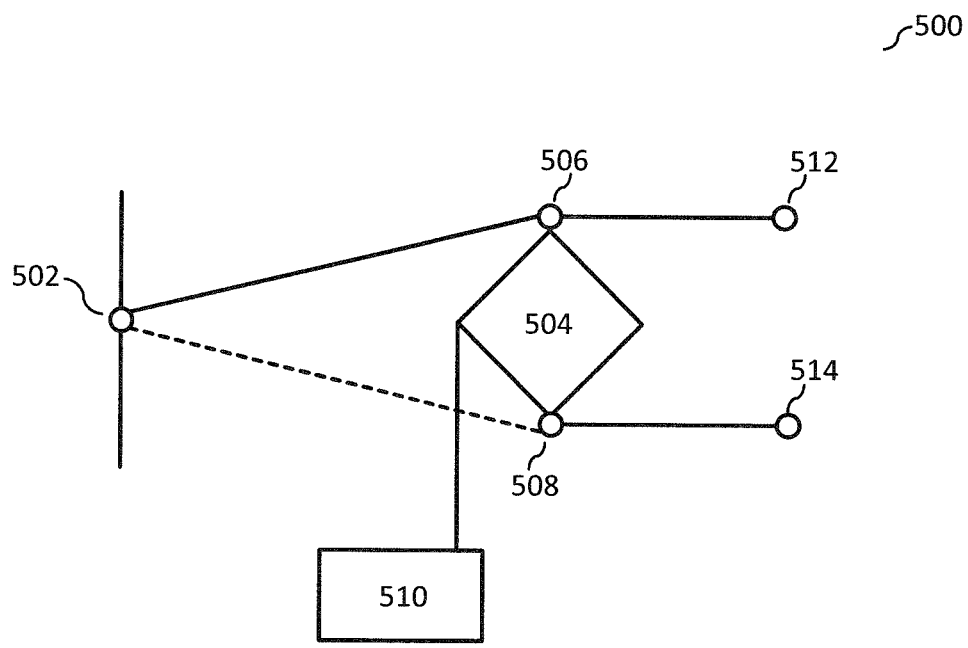
FIG. 5 shows a schematic of the circuit for generating a local bias voltage according to various embodiments.

In FIG. 5 a schematic layout of the circuit according to various embodiments is shown. The circuit 500 may be used to generate a floating bias voltage. The circuit 500 according to various embodiments may include a node 502 at which a circuit potential may be provided. The circuit potential may be derived from a power supply, for example a battery of a vehicle, which may be coupled to the circuit 500 according various embodiments. The node 502 may be located at any position in the circuit 500 according to various embodiments, for example it may be located at an electrical path coupling two electronic components/devices within the circuit 500. The circuit 500 according to various embodiments may further include an alternating voltage providing circuit 510 configured to provide a DC current free alternating voltage and a rectifier 504 coupled to the alternating voltage providing circuit 510, the rectifier 504 including a first rectifier terminal 506 and a second rectifier terminal 508, wherein the first rectifier terminal 506 or the second rectifier terminal 508 may be coupled to the node 502. In the embodiment of the circuit 500 shown in FIG. 5 the first rectifier terminal 506 is coupled to the node 502, the dashed line between the second rectifier terminal 508 and the node 502 representing the alternative configuration (in that case the first rectifier terminal 506 is not coupled to the node 502). The circuit 500 according to various embodiments may further include a first output terminal 512 and a second output terminal 514, wherein the first output terminal 512 may be coupled to the first rectifier terminal 506 to provide a first potential and wherein the second output terminal 514 may be coupled to the second rectifier terminal 518 to provide a second potential different from the first potential. The difference between the first potential and the second potential may define an output voltage, wherein the output voltage may be constant independent of the circuit potential. The amplitude of the output voltage may be defined by the signal generated by the alternating voltage providing circuit 510 which is provided to the rectifier 504. The output voltage may correspond to a local supply voltage generated by the circuit 500 which may be provided to electronic devices/components such as signal processing logic (for example, an ADC) coupled to the first output terminal 512 and a second output terminal 514 of the circuit 500 according to various embodiments.

In accordance with various embodiments, a circuit is provided which may include a node at which a circuit potential may be provided; an alternating voltage providing circuit configured to provide a DC current free alternating voltage; a rectifier coupled to the alternating voltage providing circuit, the rectifier including a first rectifier terminal and a second rectifier terminal, wherein the first rectifier terminal or the second rectifier terminal may be coupled to the node; and a first output terminal and a second output terminal, wherein the first output terminal may be coupled to the first rectifier terminal to provide a first potential and wherein the second output terminal may be coupled to the second rectifier terminal to provide a second potential different from the first potential, the difference between the first potential and the second potential defining an output voltage, wherein the output voltage may be constant independent of the circuit potential.

According to further embodiments of the circuit the alternating voltage circuit may include a first signal generator which may be configured to provide a first pulsed signal.

According to further embodiments of the circuit the first signal generator may be configured to generate a rectangular pulse signal.

According to further embodiments of the circuit the alternating voltage circuit may further include a first capacitor which is coupled between the output of the first signal generator and a first input of the rectifier.

According to further embodiments of the circuit the first signal generator may be configured as a charge pump providing charges to the first capacitor.

According to further embodiments of the circuit the alternating voltage circuit may include a second signal generator which is configured to generate a second pulsed signal.

According to further embodiments of the circuit the second signal generator may be configured to generate a rectangular pulse signal.

According to further embodiments of the circuit the alternating voltage circuit may further include a second capacitor which is coupled between the output of the second signal generator and a second input of the rectifier.

According to further embodiments of the circuit the second signal generator may be configured as a charge pump providing charges to the second capacitor.

According to further embodiments of the circuit the alternating voltage circuit may further include a first signal generator which may be configured to generate a first pulsed signal; a second signal generator which may be configured to generate a second pulsed signal, wherein the second pulsed signal may corresponds to the inverse first pulsed signal.

According to further embodiments of the circuit the amplitude of the output voltage may correspond to the amplitude of the first pulsed signal and/or the second pulsed signal.

According to further embodiments of the circuit the rectifier may include four diodes in a bridge rectifier arrangement.

According to further embodiments of the circuit at least one of the diodes may include a field effect transistor, wherein one of the source/drain terminals of the field effect transistor is electrically coupled to the gate terminal thereof.

According to further embodiments of the circuit the rectifier may include two diodes in a half-bridge rectifier arrangement.

According to further embodiments of the circuit the alternating voltage providing circuit may include a transformer.

According to further embodiments the circuit may further include a resistor including a first resistor terminal and a second resistor terminal; and a power supply input configured to provide a power supply potential, wherein the power supply input is coupled to the first resistor terminal.

According to further embodiments the circuit may further include a first switch; and a third capacitor, wherein the first switch may be coupled between the third capacitor and the first resistor terminal.

According to further embodiments of the node may correspond to (or equivalently may be coupled to) the first resistor terminal and the first rectifier terminal may be coupled thereto; wherein the first switch may be configured as a PMOS transistor.

According to further embodiments of the circuit the node may correspond to (or equivalently may be coupled to) the second resistor terminal and the second rectifier terminal may be coupled thereto; wherein the first switch is configured as an NMOS transistor.

According to further embodiments the circuit may further include a second switch and a fourth capacitor, wherein the second switch may be coupled between the fourth capacitor and the second resistor terminal.

According to further embodiments of the circuit the node may correspond to (or equivalently may be coupled to) the first resistor terminal and the first rectifier terminal may be coupled thereto, wherein the second switch is configured as a PMOS transistor.

According to further embodiments of the circuit the node may correspond to (or equivalently may be coupled to) the second resistor terminal and the second rectifier terminal may be coupled thereto, wherein the second switch may be configured as an NMOS transistor.

According to further embodiments the circuit may further include a first switch; a third capacitor, wherein the first switch may be coupled between the third capacitor and the first resistor terminal; a second switch; a fourth capacitor, wherein the second switch may be coupled between the fourth capacitor and the second resistor terminal, wherein the first switch, the third capacitor, the second switch and the fourth capacitor may form a switched capacitor circuit.

According to further embodiments the circuit may further include an ADC coupled to the third capacitor and the fourth capacitor, wherein the switched capacitor circuit may be configured to sample the signal across the resistor and provide the sampled signal to the ADC.

According to further embodiments of the circuit, the resistor may be configured such that the output voltage may be smaller than the amplitude of the first pulsed signal.

According to further embodiments the circuit may further include a fifth capacitor coupled between the first output terminal and the second output terminal.

According to further embodiments of the circuit the first signal generator may be configured as an inverter.

According to further embodiments of the circuit the second signal generator may be configured as an inverter.

In accordance with various further embodiments a circuit is provided, the circuit including a node at which a circuit potential may be provided; a voltage generator configured to provide an alternating voltage which may be free of a DC current component; a rectifier coupled to the voltage generator, the rectifier including a first terminal and a second terminal, wherein the first terminal or the second terminal may be coupled to the node; and a first circuit output and a second circuit output, wherein the first circuit output may be coupled to the first terminal to provide a first potential and wherein the second circuit output may be coupled to the second terminal to provide a second potential different from the first potential, the difference between the first potential and the second potential defining an output voltage, wherein the output voltage may be constant independent of the circuit potential.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit, comprising:
   a node at which a circuit potential is provided;
   an alternating voltage providing circuit configured to provide a DC current free alternating voltage;
   a rectifier coupled to the alternating voltage providing circuit, the rectifier comprising a first rectifier terminal and a second rectifier terminal, wherein the first rectifier terminal or the second rectifier terminal is coupled to the node; and
   a first output terminal and a second output terminal, wherein the first output terminal is coupled to the first rectifier terminal to provide a first potential and wherein the second output terminal is coupled to the second rectifier terminal to provide a second potential different from the first potential, the difference between the first potential and the second potential defining an output voltage;
   a resistor comprising a first resistor terminal and a second resistor terminal, wherein the node corresponds to the first resistor terminal or the second resistor terminal;
   a first switch coupled between a first input capacitor and the first resistor terminal, and
   wherein the output voltage is constant independent of the circuit potential.

2. The circuit of claim 1,
   wherein the alternating voltage circuit comprises a first signal generator which is configured to provide a first pulsed signal.

3. The circuit of claim 2,
   wherein the first signal generator is configured to generate a rectangular pulse signal.

4. The circuit of claim 2,
   wherein the alternating voltage circuit further comprises a first capacitor which is coupled between the output of the first signal generator and a first input of the rectifier.

5. The circuit of claim 4,
   wherein the first signal generator is configured as a charge pump providing charges to the first capacitor.

6. The circuit of claim 1,
   wherein the alternating voltage circuit comprises a second signal generator which is configured to generate a second pulsed signal.

7. The circuit of claim 6,
   wherein the second signal generator is configured to generate a rectangular pulse signal.

8. The circuit of claim 6,
   wherein the alternating voltage circuit further comprises a second capacitor which is coupled between the output of the second signal generator and a second input of the rectifier.

9. The circuit of claim 8,
   wherein the second signal generator is configured as a charge pump providing charges to the second capacitor.

10. The circuit of claim 1,
    wherein the alternating voltage circuit further comprises:
    a first signal generator which is configured to generate a first pulsed signal;

a second signal generator which is configured to generate a second pulsed signal;
wherein the second pulsed signal corresponds to the inverse first pulsed signal.

11. The circuit of claim 10, wherein the amplitude of the output voltage corresponds to the amplitude of the first pulsed signal and/or the second pulsed signal.

12. The circuit of claim 1, wherein the rectifier comprises four diodes in a bridge rectifier arrangement.

13. The circuit of claim 12, wherein at least one of the diodes comprises a field effect transistor, wherein one of the source/drain terminals of the field effect transistor is electrically coupled to the gate terminal thereof.

14. The circuit of claim 1, wherein the rectifier comprises two diodes in a half-bridge rectifier arrangement.

15. The circuit of claim 1, wherein the alternating voltage providing circuit comprises a transformer.

16. The circuit of claim 1, further comprising:
a power supply input configured to provide a power supply potential, wherein the power supply input is coupled to the first resistor terminal.

17. The circuit of claim 1, wherein the node corresponds to the first resistor terminal and the first rectifier terminal is coupled thereto; and
wherein the first switch is configured as a PMOS transistor.

18. The circuit of claim 1, wherein the node corresponds to the second resistor terminal and the second rectifier terminal is coupled thereto; and
wherein the first switch is configured as an NMOS transistor.

19. The circuit of claim 1, further comprising:
a second switch coupled between a second input capacitor and the second resistor terminal.

20. The circuit of claim 19, wherein the node corresponds to the first resistor terminal and the first rectifier terminal is coupled thereto; and
wherein the second switch is configured as a PMOS transistor.

21. The circuit of claim 19, wherein the node corresponds to the second resistor terminal and the second rectifier terminal is coupled thereto; and
wherein the second switch is configured as an NMOS transistor.

22. The circuit of claim 19, wherein the first switch, the first input capacitor, the second switch and the second input capacitor form a switched capacitor circuit.

23. The circuit of claim 22, further comprising:
an ADC coupled to the first input capacitor and the second input capacitor,
wherein the switched capacitor circuit is configured to sample the signal across the resistor and provide the sampled signal to the ADC.

24. A circuit, comprising:
a node at which a circuit potential is provided;
a voltage generator configured to provide an alternating voltage which is free of a DC current component;
a rectifier coupled to the voltage generator, the rectifier comprising a first terminal and a second terminal, wherein the first terminal or the second terminal is coupled to the node; and
a first circuit output and a second circuit output, wherein the first circuit output is coupled to the first terminal to provide a first potential and wherein the second circuit output is coupled to the second terminal to provide a second potential different from the first potential, the difference between the first potential and the second potential defining an output voltage,
a resistor coupled to the node;
a switch coupled between a capacitor and an end of the resistor; and
wherein the output voltage is constant independent of the circuit potential.

25. A circuit, comprising:
an alternating voltage providing circuit configured to provide an alternating voltage free of a DC current component;
a rectifier coupled to an output of the alternating voltage providing circuit;
a reference potential coupled to an output of the rectifier,
a resistor coupled to the reference potential;
a switch coupled between a capacitor and the resistor,
wherein an output voltage generated by the rectifier is independent of the reference potential.

* * * * *